Patented Mar. 11, 1952

2,589,150

UNITED STATES PATENT OFFICE 2,589,150

INSECTICIDE

Valerie Schneider, Phillips, Tex., assignor to Phillips Petroleum Company, a corporation of Delaware No Drawing. Application April 9, 1946,
Serial No. 660,844

5 Claims. (Cl. 167—28)

This invention relates to insecticides and insect repellents of highly effective character obtainable from low-cost raw materials.

Various halogenated organic compounds are known as more or less effective insecticides and the like. Among the best known of these are the dichloro diphenyl trichlorethane (DDT), ortho and para-dichlorbenzenes, hexachlorethane, and the like. These compounds possess varying degrees of effectiveness and must be used each in a particular manner in order to achieve optimum results. The more effective of the halogenated compounds are relatively expensive due to cost of starting materials or difficulties in manufacture.

Applicant has now discovered that highly effective insecticides and insect repellents may be obtained by the halogenation of materials derived from petroleum oils. These materials to be halogenated are fractions containing ring structures obtained from residues of catalytic or thermal cracking or dehydrogenation of petroleum oils. These residues, or fractions thereof having the desired volatility, may themselves be halogenated to obtain products suitable as insecticides and repellents. In general, however, it is preferred to utilize selected fractions of polymers obtained by mild polymerization of cracked petroleum oils, such as is the case with Gray tower polymers. Such polymers are usually obtained from vapor phase cracked petroleum oils.

It is, therefore, an object of the present invention to obtain highly effective insecticides and insect repellents by the halogenation of residues obtained from cracked or dehydrogenated petroleum oils. It is a further object of the present invention to obtain insecticides and repellents by the halogenation of polymers obtained in the mild polymerization of cracked petroleum products, such as Gray tower polymers or fractions thereof. It is a still further object of the present invention to provide insecticides and insect repellents prepared by chlorination of Gray tower polymers and fractions thereof.

Vapor phase cracking processes are distinguished from liquid phase processes in that the former operate at relatively higher temperatures and relatively lower pressure than do the latter. The gasoline and gases produced by vapor phase cracking are generally much higher in unsaturates (particularly of the more reactive types) than are the gasolines and gases produced by liquid phase cracking.

In order to remove these highly unsaturated bodies, as well as color bodies, from cracked gasoline, such gasoline is treated with a polymerizing agent, such as fuller's earth or sulphuric acid, or simply by the application of heat and pressure in the presence or absence of a contact material. For example, in one such polymerizing process operating at present, the unrefined cracked gasoline (which has been separated from heavier constituents by fractionation) is passed in liquid or vapor phase through a tower packed with fuller's earth or similar earthy polymerizing material. Here polymerization of the more active ingredients of the cracked material takes place, such polymers (along with some of the heavier ends of the gasoline) then being drained off in liquid form from the earthy polymerizing material. These polymers when brought, say, to a viscosity at 100° F. of 175 (Saybolt Universal) by removal of lighter materials through distillation, show pronounced drying qualities.

It has been found that when highly unsaturated mineral hydrocarbons such as are found in unrefined vapor or mixed phase cracked gasoline are brought into contact, preferably in vapor phase, with active contact masses such as fuller's earth, active clay, silica gel and the like, the most active hydrocarbons are polymerized to heavy mineral hydrocarbons and these materials when halogenated form the active materials of the present invention. Therefore, the materials whose use is particularly contemplated in the present invention are polymers formed by the moderate action of active contact masses or dilute sulfuric acid on unrefined gasoline, produced by vapor, liquid, or mixed phase cracking, such polymerization with contact masses occurring in the liquid or vapor phase, or with dilute sulfuric acid in the liquid phase. Such a reaction may be carried on at temperatures ranging from 150° F. to 650° F. for contact masses, and from ordinary temperatures to 200° F. for dilute sulfuric acid. It will in general be found that an increase in reaction time or in reaction temperature or acid concentration will decrease the iodine number and increase the drying time of a material such as described above. As one specific example of the process of deriving polymers to be used in the present process, naphtha is polyformed with propane at a temperature of about 1050° F. and pressure of about 1500 pounds per square inch in a mixed phase operation. The product is then fractionated to separate heavier ends, the remaining gasoline vapors then being brought without further refining steps into contact with an active contact mass such as fuller's earth or other active clay at temperatures of 150° F. to 650° F. to cause polymerization of the most unsaturated portions of the gasoline. In this polymerizing step the reaction time and temperature are regulated as indicated above to produce polymers of the desired characteristics. The polymers may then be separated from the gasoline by condensation or fractionation and are fractionated, preferably by steam or vacuum distillation, if it is desired to produce polymers of greater non-volatile content. Such a polymerization treatment is commonly known in the art as a Gray tower process and the product is referred to as Gray tower polymer.

The starting materials of our invention generally consist essentially of $C_{14}$ to $C_{20}$ hydrocarbons, with molecular weights of about 190 to 260. They contain alkyl benzenes and compounds having one and two six-membered rings of the aromatic or naphthenic type or both. Polymers substantially free of materials boiling below 400° F. are usually preferred as initial materials, although lower boiling compositions may be used if desired. The final halogenated product will contain from 20 to 50 weight per cent of halogen. The resulting halogenated compounds can be dissolved in suitable solvents, among which are alcohols, ketones, and aromatic and aliphatic hydrocarbons. When desired, they can be emulsified with water or other immiscible liquids using well known dispersing agents and the dissolved or emulsified materials used as sprays, etc. Where the products are solid in form they can be pulverized and used as dusts alone or admixed with inert carriers such as talc, powdered rock, lime, etc. Dusts can also be made by spraying the inert carriers with solutions of the insecticides in volatile solvents.

The insecticide of the present invention is effective in concentrations of 1 mg. per cubic foot of space or greater, and may be utilized in solutions, suspensions, or dusts in concentrations of 1 per cent or more.

The following examples represent typical modes of preparing and using the novel compositions of my invention.

*Example I*

The insecticide tested was made from a fraction boiling at 402–408° F., light yellow in color, and obtained from a clay tower polymer of the type described above by fractionation. It had been refined by selective solvent treating which removed most of the naphthenes, and treated at low temperature with pentane to remove naphthalene. Its composition was mainly alkyl benzenes, with some two ring aromatics, and it had a refractive index of 1.5035 at 20° C. and a density of 0.8866 at 25° C. Chlorination of this fraction was carried out by adding the oil slowly to a solution of chlorine in carbon tetrachloride, allowing the mixture to stand several days, and then air blowing to evaporate the solvent and excess chlorine. The chlorinated product was stable, light yellow, and with little odor.

This chlorinated product was employed in 10.0 per cent solutions in alcohol and in kerosene. The technique used in testing the products was to confine a definite number of flies in a screened cage in a small building of known volume (124 cubic feet). A definite volume of the solution was then sprayed into the room. After a period of exposure, the flies were removed to a beaker in the open air and observed for a considerably longer period.

In one experiment, a volume of 12 ml. of the 10 per cent alcohol solution was sprayed into the room (approximately 8 mg./cubic feet); 30 flies were in the screen trap. After 30 minutes all the flies had dropped to the floor or were becoming inert. At an hour all were down. At 90 minutes the trap was removed to the air. Ten per cent of the flies were dead. After 6 hours more in the open air 60 per cent had died without recovering normal motor functions. After 13 hours, all were dead except two. These had shown the least signs of toxicity at all stages.

In an experiment with the kerosene solution, 8 ml. was sprayed into the room. The cage of flies was removed to the open and the flies put in a beaker after only 60 minutes. At this time all were alive, but stunned and could not move normally. After four hours more in the air 66 per cent had died and 24 per cent were stunned. After 13 hours more 90 per cent had died.

The insecticide shows a rather slow "knockdown" on flies, although apparently considerably better than most DDT preparations now in use. The percentage of kill in 24 hours is high however.

*Example II*

A Gray tower polymer prepared by clay-treating a polyformed gasoline which had been prepared by polyforming a gas oil using $C_3$ and $C_4$ gases at about 1000° F. was recovered and reduced by distillation of light components. A viscous polymeric material boiling above about 450° F. was chlorinated in the manner described in Example I until no further chlorine was added. After evaporation of the solvent a yellow solid was obtained. This solid powdered easily and appeared to be quite stable as to odor and other physical properties. The powder was tested by dusting on large ants, cockroaches, and flies. A high proportion of kill resulted, showing that the powder is effective as a contact insecticide.

*Example III*

A fraction of Gray tower polymer obtained by clay-treating a polyformed gasoline as described in Example I boiling between approximately 428° F. and 464° F. was chlorinated by shaking with chlorine until approximately 20 per cent chlorine had been added. A very small amount of this product rubbed on a door kept flies from alighting on the door for several hours. A few drops in the entrance to about 15 ant beds of both large and small ants resulted in the disappearance of the ants entirely or in a few cases the closing up of the entrance and digging of another. In those cases where the ants did not disappear a much lower activity was noted. Small bugs and plant lice were also repelled.

A 50 per cent chlorinated product gave similar results.

A similar Gray tower fraction was brominated by shaking with bromine in the same manner and the bromine product also demonstrated a repelling action similar to that of the chlorinated products.

I claim:

1. An insecticidal composition containing as an active ingredient a halogenated Gray tower polymer fraction.

2. An insecticidal composition containing as an active ingredient a halogenated polymer obtained by clay treating a vapor phase cracked petroleum oil at a temperature of 150–650° F., separating a polymer obtained thereby, and halogenating said polymer by direct contact with a halogen until at least partial halogenation is achieved.

3. The method of preparing an insecticide which comprises polymerizing a cracked petroleum oil by contact in the vapor phase with an active clay at a temperature of 150-650° F., recovering a fraction of the polymerized material so obtained, and contacting said polymer fraction with a halogen to effect at least partial halogenation thereof.

4. An insecticidal composition of matter comprising as an active ingredient thereof a chlorinated Gray tower polymer obtained by the chlorination of polymers obtained from cracked petroleum distillate by contact thereof with mild polymerizing agents, and a carrier therefor.

5. An insecticidal composition according to claim 4 wherein said chlorinated Gray tower polymer is substantially free of material boiling below 400° F.

VALERIE SCHNEIDER.

REFERENCES CITED

The following references are of record in the file of this patent:

UNITED STATES PATENTS

| Number | Name | Date |
| --- | --- | --- |
| 2,010,841 | Bender | Aug. 13, 1935 |
| 2,155,204 | Prutton | Apr. 18, 1939 |
| 2,174,069 | Dreisbach | Sept. 26, 1939 |
| 2,261,758 | Gustafsson | Nov. 4, 1941 |
| 2,291,507 | Sowers | July 28, 1942 |

FOREIGN PATENTS

| Number | Country | Date |
| --- | --- | --- |
| 684,419 | Germany | Nov. 28, 1939 |